US008215851B2

(12) United States Patent
Onoda

(10) Patent No.: US 8,215,851 B2
(45) Date of Patent: Jul. 10, 2012

(54) PRINT CONTROL APPARATUS THAT CONTROLS PRINTING DEVICE PERFORMING PRINTING ON PRINT SHEET HAVING TAB

(75) Inventor: Yuko Onoda, Nishinomiya (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 792 days.

(21) Appl. No.: 11/520,610

(22) Filed: Sep. 14, 2006

(65) Prior Publication Data

US 2008/0003037 A1 Jan. 3, 2008

(30) Foreign Application Priority Data

Jun. 28, 2006 (JP) ................................ 2006-177911

(51) Int. Cl.
*B41J 29/38* (2006.01)
*G06F 3/12* (2006.01)

(52) U.S. Cl. ......................... 400/76; 358/1.18; 358/1.11

(58) Field of Classification Search ..................... 400/76
See application file for complete search history.

(56) References Cited

U.S. PATENT DOCUMENTS 5,051,820 A * 9/1991 Sasaki .......................... 358/524
6,452,694 B1 * 9/2002 Eisenberg et al. ........... 358/1.18
6,795,664 B2 * 9/2004 Sugimoto ....................... 399/81
7,103,837 B2 * 9/2006 Sato ............................. 715/274
7,151,617 B2 * 12/2006 Fukushima et al. ......... 358/1.16
2001/0046059 A1 * 11/2001 Motamed et al. ............ 358/1.12
2004/0085583 A1 5/2004 Yamamura
2004/0263869 A1 * 12/2004 Kimura .......................... 358/1.1
2005/0041993 A1 * 2/2005 Barry et al. .................. 399/127
2006/0045596 A1 * 3/2006 Tischler .......................... 400/76
2007/0009300 A1 * 1/2007 Young et al. .................... 400/76
2007/0098473 A1 * 5/2007 Heyse et al. ..................... 400/76
2008/0014002 A1 * 1/2008 Edamatsu ........................ 400/76

FOREIGN PATENT DOCUMENTS

JP 2001-035893 2/2001
JP 2002008049 A * 1/2002
JP 2003-174551 6/2003
JP 2004-151505 5/2004
JP 2004-168035 6/2004
JP 2005181873 A * 7/2005
JP 2005-267584 9/2005
JP 2005-318452 11/2005
JP 2006-142610 6/2006
JP 2006-237677 9/2006

OTHER PUBLICATIONS

Pogue, David; Windows XP Home Edition: The missing Manual, Second Edition; Dec. 2004; O'Reillyl Meida, Inc. p. 264.*

* cited by examiner

*Primary Examiner* — Daniel J Colilla
(74) *Attorney, Agent, or Firm* — Buchanan Ingersoll & Rooney PC

(57) ABSTRACT

When a printer driver is activated in a PC for performing setting about a tab sheet, the printer driver presents a screen for setting a background color of the tab sheet and receives designation of a desired background color for each tab sheet. It also receives designation of an area of the tab sheet to be colored, and in the case of coloring by bordering, it receives designation of thickness and style thereof. It further receives designation of presence/absence of a background color for the back surface of the tab sheet, and designation of the background color when present.

23 Claims, 16 Drawing Sheets

FIG.5

| | PAGE NUMBER | PAPER FEED TRAY | TITLE LETTERS | COLOR | ··· |
|---|---|---|---|---|---|
| TAB1 | 10 | TRAY1 | AAA | RED | ··· |
| TAB2 | 20 | TRAY1 | BBB | ORANGE | ··· |
| TAB3 | 30 | TRAY1 | CCC | YELLOW | ··· |
| ⋮ | ⋮ | ⋮ | ⋮ | ⋮ | |

PRINT CONTROL APPARATUS THAT CONTROLS PRINTING DEVICE PERFORMING PRINTING ON PRINT SHEET HAVING TAB

This application is based on Japanese Patent Application No. 2006-177911 filed with the Japan Patent Office on Jun. 28, 2006, the entire content of which is hereby incorporated by reference.

BACKGROUND OF THE INVENTION

1. Field of the Invention

The present invention relates to a print control apparatus, a print control program product and a print control method, and particularly to a print control apparatus, a print control program product and a print control method for controlling a printing device that performs printing using a print sheet having a tab.

2. Description of the Related Art

A printing device that performs printing using a print sheet having a tab (hereinafter, referred to as a "tab sheet") has been proposed.

For example, Japanese Laid-Open Patent Publication No. 2004-151505, previously filed by the applicant and now published (hereinafter, "Patent Document 1"), discloses an image forming apparatus capable of inserting a tab sheet of a desired tab position into a desired page position by detecting whether a fed sheet is a tab sheet or not and also by detecting the tab position and the tab direction before a transferring operation.

When colored tab sheets are used in a conventional printing device performing printing on a tab sheet as disclosed in Patent Document 1, however, the color of the tab sheet is restricted depending on the tab position. This poses a problem that it is not possible to provide a desired combination of the tab position and the color of the tab sheet.

Further, if tab sheets of different colors for different tab positions are prepared in order to provide a desired combination of the tab position and the color of the tab sheet, the cost will increase compared to the case of preparing tab sheets of a single color.

SUMMARY OF THE INVENTION

The present invention has been made to solve the above-described problems, and an object of the present invention is to provide a print control apparatus, a print control program product and a print control method for controlling a printing device such that it performs printing using tab sheets of a single color to realize a desired combination of the tab position and the background color of the tab sheet.

To achieve the above-described object, according to an aspect of the present invention, a print control apparatus controls a printing device performing printing on a tab sheet identified as a print sheet having a tab, which includes: a setting unit setting a background color of a tab sheet; and a generating unit generating control information for printing the background color set by the setting unit on the tab sheet.

According to another aspect of the present invention, a print control program product causes a computer to execute control of a printing device that performs printing on a tab sheet identified as a print sheet having a tab. The control includes the steps of: presenting an operation screen to a user and receiving designation of a background color of a tab sheet according to the operation screen; generating control information for printing the set background color on the tab sheet; and transmitting the control information to the printing device.

According to a further aspect of the present invention, a print control method controls a printing device performing printing on a tab sheet identified as a print sheet having a tab, using a print control apparatus. The method includes the steps of: presenting an operation screen to a user and designating a background color of a tab sheet according to the operation screen; generating control information for printing the set background color on the tab sheet; and providing the control information to the printing device.

When the print control apparatus of the present invention controls a printing device, a tab sheet of desired coloration can be generated by the printing device. This can restrict the cost compared to the case where tab sheets of different colors are prepared for different tab positions. Further, when the area for coloring is set in the tab sheet, the consumed amount of toner can be reduced compared to the case of coloring the entire surface of the tab sheet.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 illustrates a specific example of configuration of tab sheet information 53.

DESCRIPTION OF THE PREFERRED EMBODIMENTS

Figure 1:
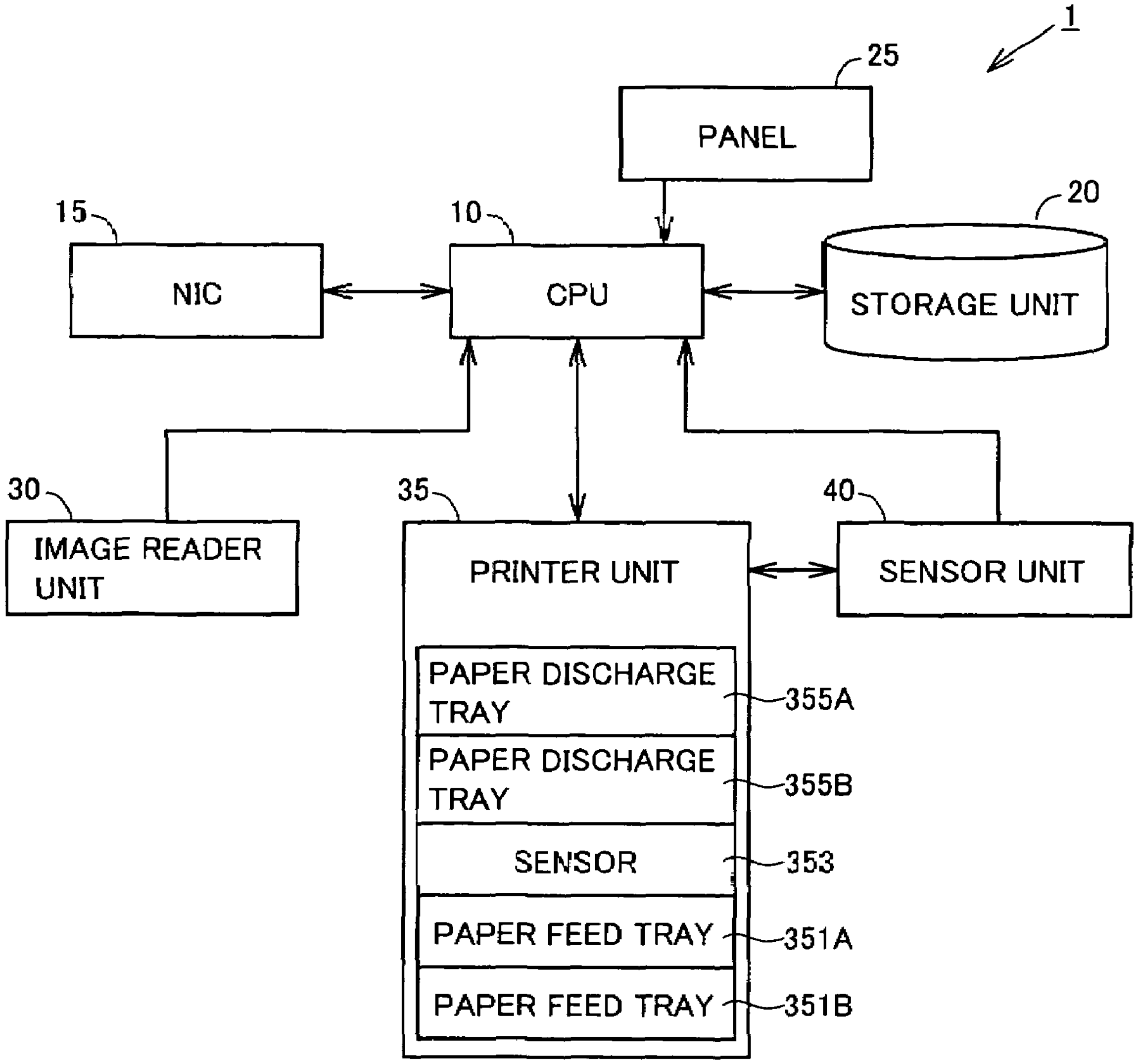
FIG. 1 is a block diagram showing a specific example of hardware configuration of a printing device 1 that is an MFP (Multi Function Peripheral).

Hereinafter, an embodiment of the present invention will be described with reference to the drawings. In the following, the same units and elements have the same reference characters allotted, and their designations and functions are identical.

A print system according to the present embodiment includes a printing device 1 and a personal computer (hereinafter, abbreviated as "PC") 3, serving as a print control apparatus, connected to printing device 1 via a wired or wireless network.

Printing device 1 may be a printer, a copier, an MFP (Multi Function Peripheral) as a combination thereof, or the like, that performs color printing using a print sheet having a tab (hereinafter, referred to as a "tab sheet"). It is assumed in the present embodiment that printing device 1 is an MFP.

Referring to FIG. 1, printing device 1 that is the MFP includes: a CPU (Central Processing Unit) 10 controlling the entire device; an image reader unit 30 reading image data from an original; a printer unit 35 printing an image on a sheet of paper; a NIC (Network Interface Card) 15 that is an expansion card inserted into an expansion slot (not shown) for connecting printing device 1 to a network or a telephone line, or for performing close-range radio communication; a storage unit 20 formed of a HD (Hard Disk), a RAM (Random Access Memory) and the like for storing a job, a program executed by CPU 10 and the like; a panel 25 that is an interface with a user; and a sensor unit 40 detecting the remaining amounts of the print sheets, toner and the like. Printer unit 35 includes a paper feed tray 351A for sheets of plain paper, a paper feed tray 351B for tab sheets, a sensor 353 detecting a shape of the sheet fed from paper feed trays 351A and 351B, a paper discharge tray 355A for discharging a printed sheet, and a paper discharge tray 355B for discharging an undesignated sheet.

Sensor 353 detects whether the fed sheet is a tab sheet or not, and also detects the size, tab position and tab direction of the tab sheet. The detection method used by sensor 353 is not restricted to a particular method in the present invention; it may use any detection method available. For example, the detection method described in Japanese Laid-Open Patent Publication No. 2004-151505 previously filed by the applicant and now published may be used.

Figure 2:
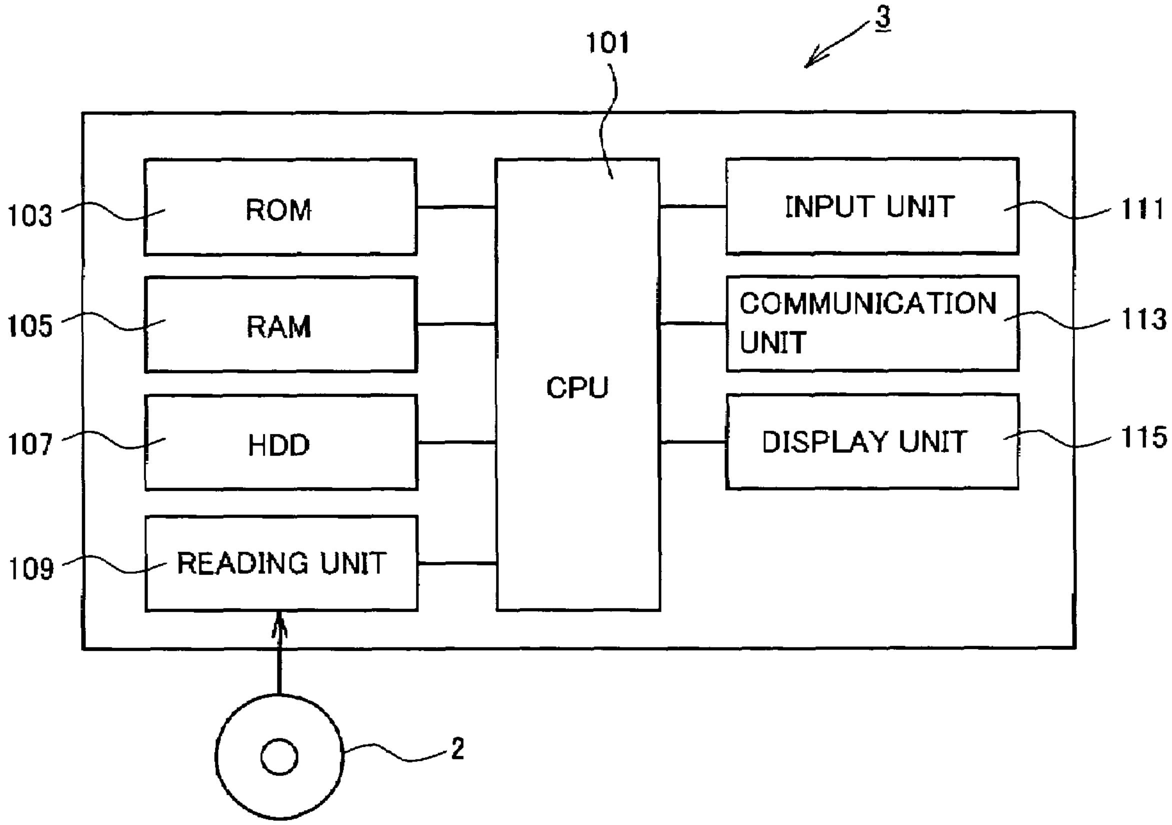
FIG. 2 is a block diagram showing a specific example of hardware configuration of a PC 3.

FIG. 2 is a block diagram showing a specific example of hardware configuration of a common personal computer, as a specific example of the hardware configuration of PC 3. Referring to FIG. 2, PC 3 includes: a CPU 101 controlling the entire device; a ROM (Read Only Memory) 103; a RAM (Random Access Memory) 105; a hard disk drive 107; a reading unit 109 reading information from a recording medium 2, such as a FDD (Flexible Disk Drive) or a CD-ROM (Compact Disk-Read Only Memory) drive; an input unit 111 formed with a keyboard, mouse and the like; a communication unit 113 for connecting to the network or for communicating with the outside; and a display unit 115.

Figure 3:
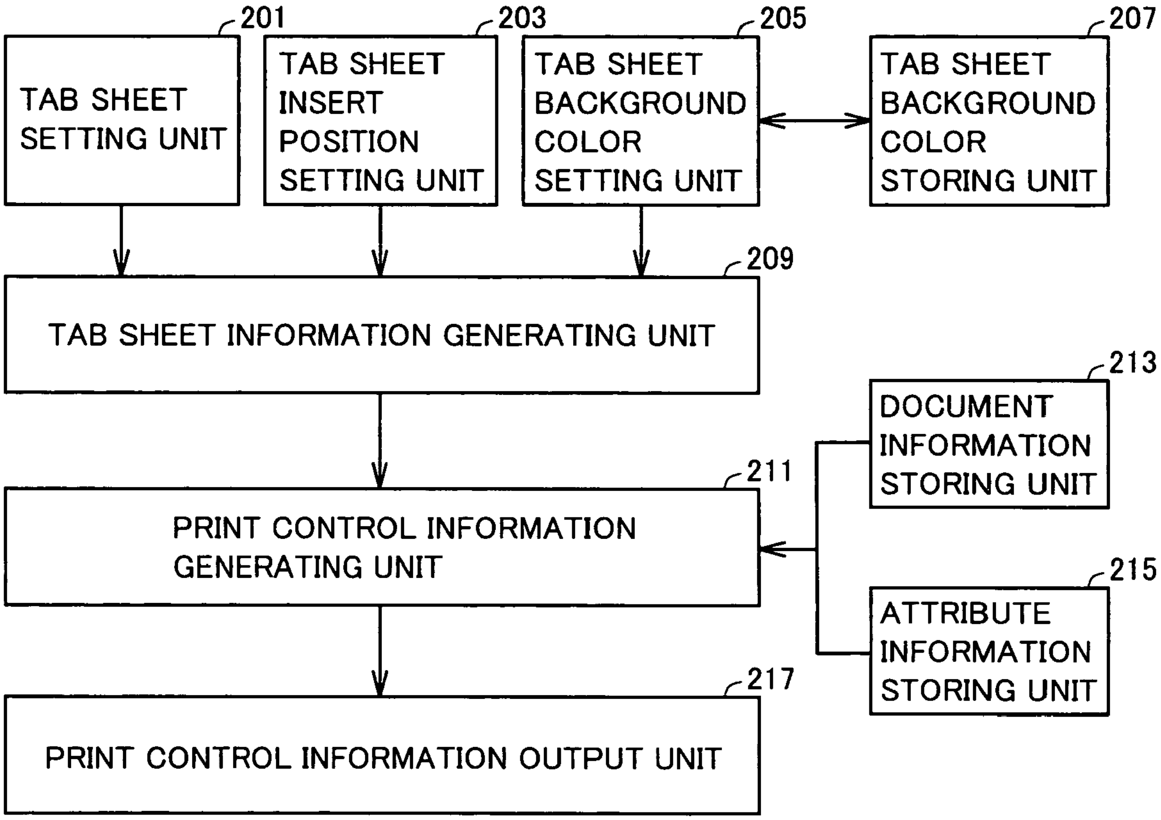
FIG. 3 is a block diagram showing a specific example of functional configuration of PC 3.

FIG. 3 is a block diagram showing a specific example of functional configuration of PC 3 for causing printing device 1 to perform printing using a tab sheet. The functions shown in FIG. 3 are implemented primarily on CPU 101 of PC 3 as CPU 101 reads and executes a program, stored in ROM 103 or the like, that is a printer driver for performing instructing operations to printing device 1. Alternatively, at least a part thereof may be realized with the hardware configuration of PC 3 shown in FIG. 2.

Referring to FIG. 3, the above-described functions of PC 3 include a tab sheet setting unit 201, a tab sheet insert position setting unit 203, a tab sheet background color setting unit 205, a tab sheet background color storing unit 207, a tab sheet information generating unit 209, a print control information generating unit 211, a document information storing unit 213, an attribute information storing unit 215, and a print control information output unit 217.

Tab sheet setting unit 201 receives, from input unit 111, setting regarding the shape of the tab sheet to be used, including the size of the tab sheet, the number of tabs and the like, and setting of the letters to be printed on the tab of the tab sheet, and provides the same to tab sheet information generating unit 209. Tab sheet insert position setting unit 203 receives, from input unit 111, setting of the tab sheet insert position, representing which tab sheet is to be inserted on which page in the document information that is the target for tab sheet insertion, and provides the same to tab sheet information generating unit 209.

Tab sheet background color setting unit 205 receives, from input unit 111, setting of the color to be applied to the tab sheet and the area to be thus colored, and provides the same to tab sheet information generating unit 209. The setting is stored in tab sheet background color storing unit 207 as well.

Tab sheet information generating unit 209 generates tab sheet information for causing printing device 1 to perform printing on a tab sheet, including the information provided from tab sheet setting unit 201, tab sheet insert position setting unit 203 and tab sheet background color setting unit 205, and provides the information to print control information generating unit 211.

Document information storing unit 213 stores document information generated by PC 3 or document information generated by another device and supplied to PC 3. Attribute information storing unit 215 stores attribute information representing attributes used for printing of the document information, which includes information of the creator of the document information, information about the typestyle, and the like. It is noted that the attribute information may be stored in document information storing unit 213 as a pair with the corresponding document information. Print control information generating unit 211 specifies the document information to be, printed based on an input from input unit 111, and retrieves the relevant document information from document information storing unit 213. It further retrieves the corresponding attribute information from attribute information storing unit 215. Print control information generating unit 211 uses the tab sheet information received from tab sheet information generating unit 209 and the retrieved document and attribute information to generate print control information for causing printing device 1 to generate an image to be printed, and provides the same to print control information output unit 217.

Figure 4:
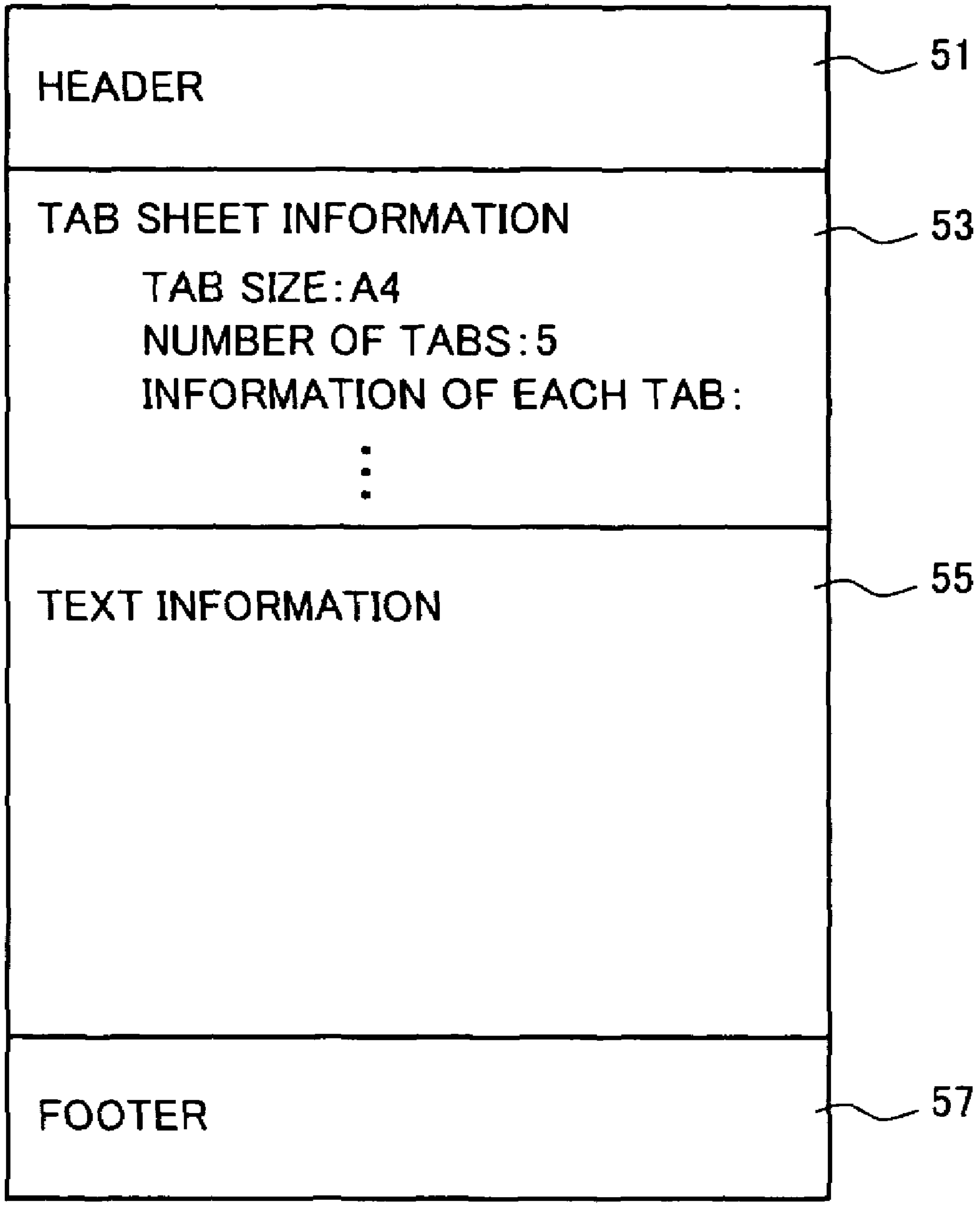
FIG. 4 illustrates an example of configuration of print control information.

FIG. 4 shows a configuration example of print control information generated by print control information generating unit 211. As shown in FIG. 4, the print control information generated by PC 3 includes a header 51, text information 55, a footer 57, and tab sheet information 53 containing the above-described tab sheet information. Tab sheet information 53 includes information about the entire tab sheet, such as the tab size, the number of tabs and the like as shown in FIG. 4, and also includes information about each tab sheet as shown in FIG. 5, such as information indicating the position (page number) in target document information to which the relevant tab sheet is to be inserted and information specifying the paper feed tray containing the tab sheet, as well as information of title letters to be printed on the tab and color to be applied to the tab sheet. These items of information are included as commands for causing printing device 1 to form a tag image. The print control information as shown in FIG. 4 is described in PDL (Page Description Language), PGL (Page Graphic Language) or the like, which is converted into a print image of bit map data in printing device 1, for printing.

The print control information, of which an example is shown in FIG. 4, is output from print control information output unit 217 to printing device 1.

Figure 6:
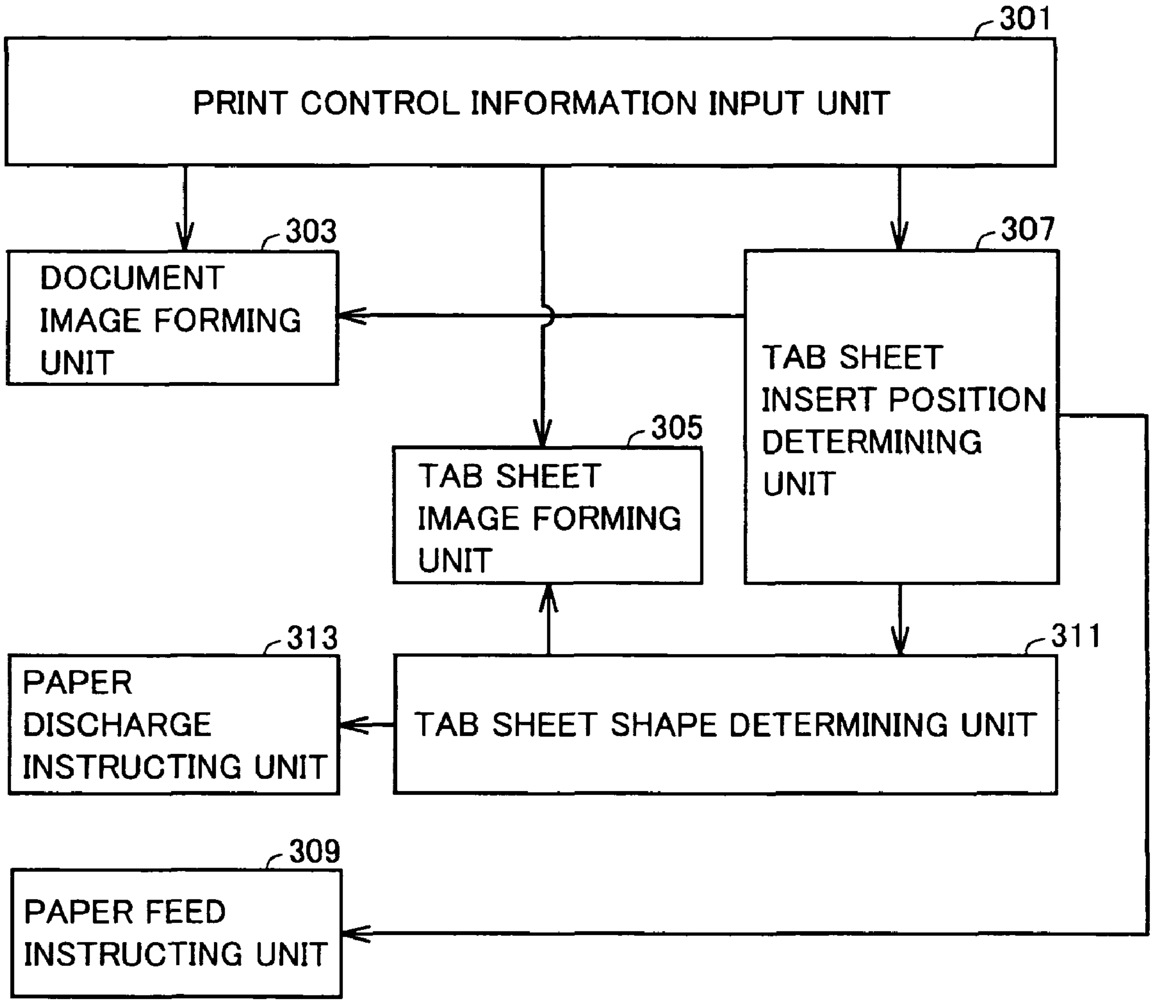
FIG. 6 is a block diagram showing a specific example of functional configuration of printing device 1.

FIG. 6 is a block diagram showing a specific example of functional configuration for performing printing using a tab sheet in printing device 1. The functions shown in FIG. 6 are implemented in CPU 10 of printing device 1 as CPU 10 reads and executes a program stored in storage unit 20. Alternatively, at least a part thereof may be realized with the hardware configuration shown in FIG. 1.

Referring to FIG. 6, the above-described functions of printing device 1 include a print control information input unit 301, a document image forming unit 303, a tab sheet image forming unit 305, a tab sheet insert position determining unit 307, a paper feed instructing unit 309, a tab sheet shape determining unit 311, and a paper discharge instructing unit 313.

Print control information input unit 301 receives the above-described print control information output from PC 3, and provides the same to document image forming unit 303, tab sheet image forming unit 305, and tab sheet insert position determining unit 307.

Tab sheet insert position determining unit 307 determines, based on tab sheet information 53, whether the page to be printed next corresponds to a page for inserting a tab sheet or a page for printing the document, and in the case where the page is for printing the tab sheet, it also determines the shape of the tab sheet to be used for printing, and provides the determined results to document image forming unit 303, paper feed instructing unit 309, and tab sheet shape determining unit 311.

Paper feed instructing unit 309 instructs printer unit 35 to feed a print sheet of a normal shape for use in printing a document in the case where the result of determination in tab sheet insert position determining unit 307 indicates that the page is for printing the document, while it instructs printer unit 35 to feed a tab sheet of the relevant shape in the case where the page is for printing a tab sheet.

When the determined result of tab sheet insert position determining unit 307 indicates that the page is for printing a tab sheet, tab sheet shape determining unit 311 determines whether a print sheet fed is a tab sheet or not, and also determines whether the fed sheet is the tab sheet having the shape determined by tab sheet insert position determining unit 307 or not, based on a sensor signal from sensor 353, and provides the determined results to tab sheet image forming unit 305 or paper discharge instructing unit 313.

When it is determined in tab sheet shape determining unit 311 that the fed print sheet is not a tab sheet even though the page is for inserting the tab sheet, or that the fed print sheet is not the tab sheet of a proper shape, paper discharge instructing unit 313 instructs printer unit 35 to discharge the relevant sheet to paper discharge tray 355B for use in discharging an undesignated sheet.

When the determined result of tab sheet insert position determining unit 307 indicates that the page is for printing the document, document image forming unit 303 forms a document image being bit map data for printing the document based primarily on text information 55, and provides the same to printer unit 35.

When the determined result of tab sheet insert position determining unit 307 indicates that the page is for printing a tab sheet and when it is determined in tab sheet shape determining unit 311 that a proper tab sheet has been fed, then tab sheet image forming unit 305 forms a tab sheet image being bit map data for printing information set for the tab sheet and for coloring the tab sheet with the color set therefor, based primarily on tab sheet information 53, and provides the same to printer unit 35.

Figure 7:
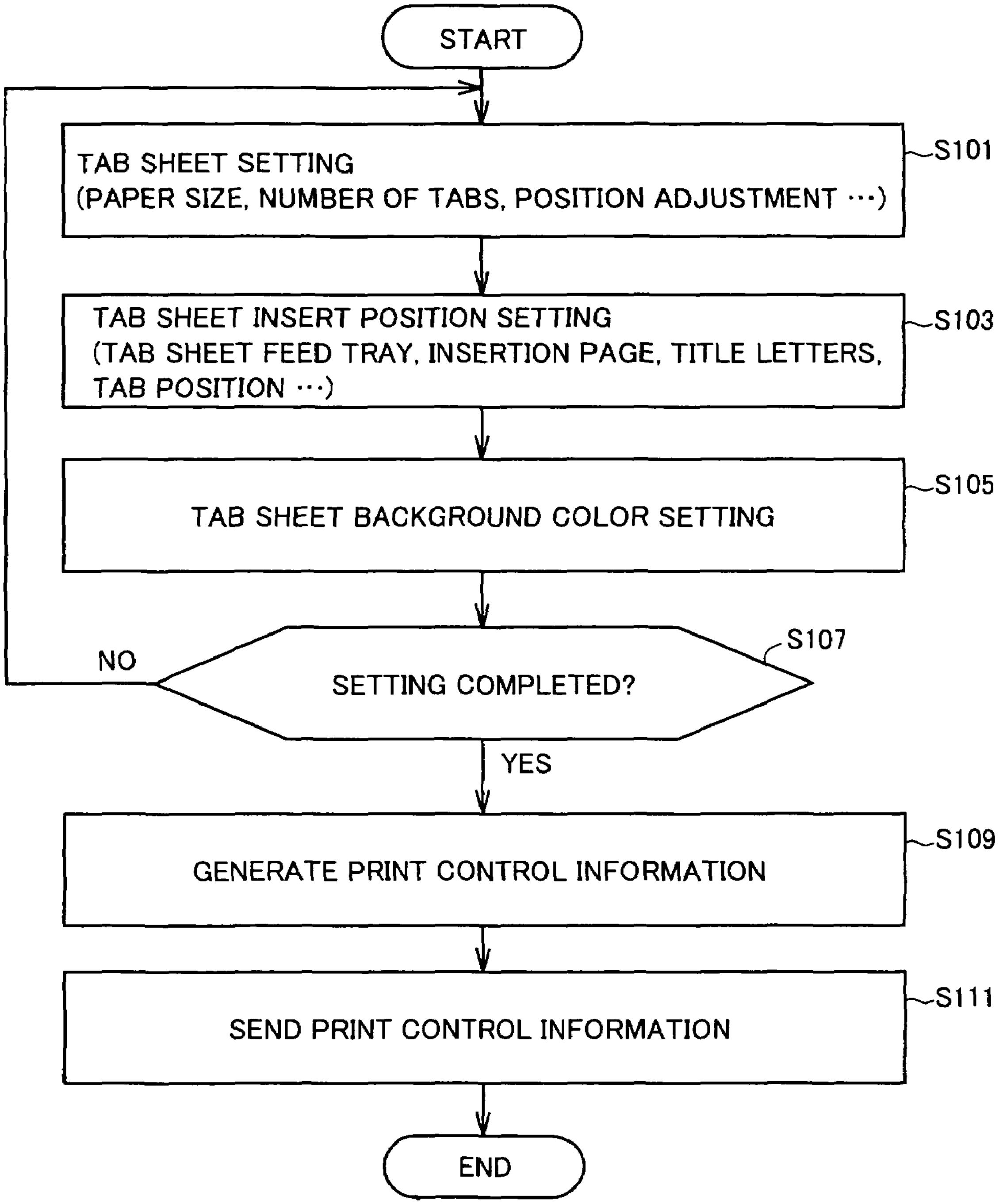
FIG. 7 is a flowchart showing processing executed by PC 3 for causing printing device 1 to perform printing using a tab sheet.

Processing executed by PC 3 for causing printing device 1 to perform printing using a tab sheet, shown by a flowchart in FIG. 7, is implemented as CPU 101 of PC 3 reads and executes a program stored in ROM 103 or the like, to control the units shown in FIG. 3.

FIGS. 8-21 are screens displayed when a printer driver is activated in PC 3 and manipulation for causing printing device 1 to perform printing using a tab sheet is conducted. They show specific examples of the screens displayed in the respective processing in the flowchart of FIG. 7, as well as the contents of the screens.

Figure 8:
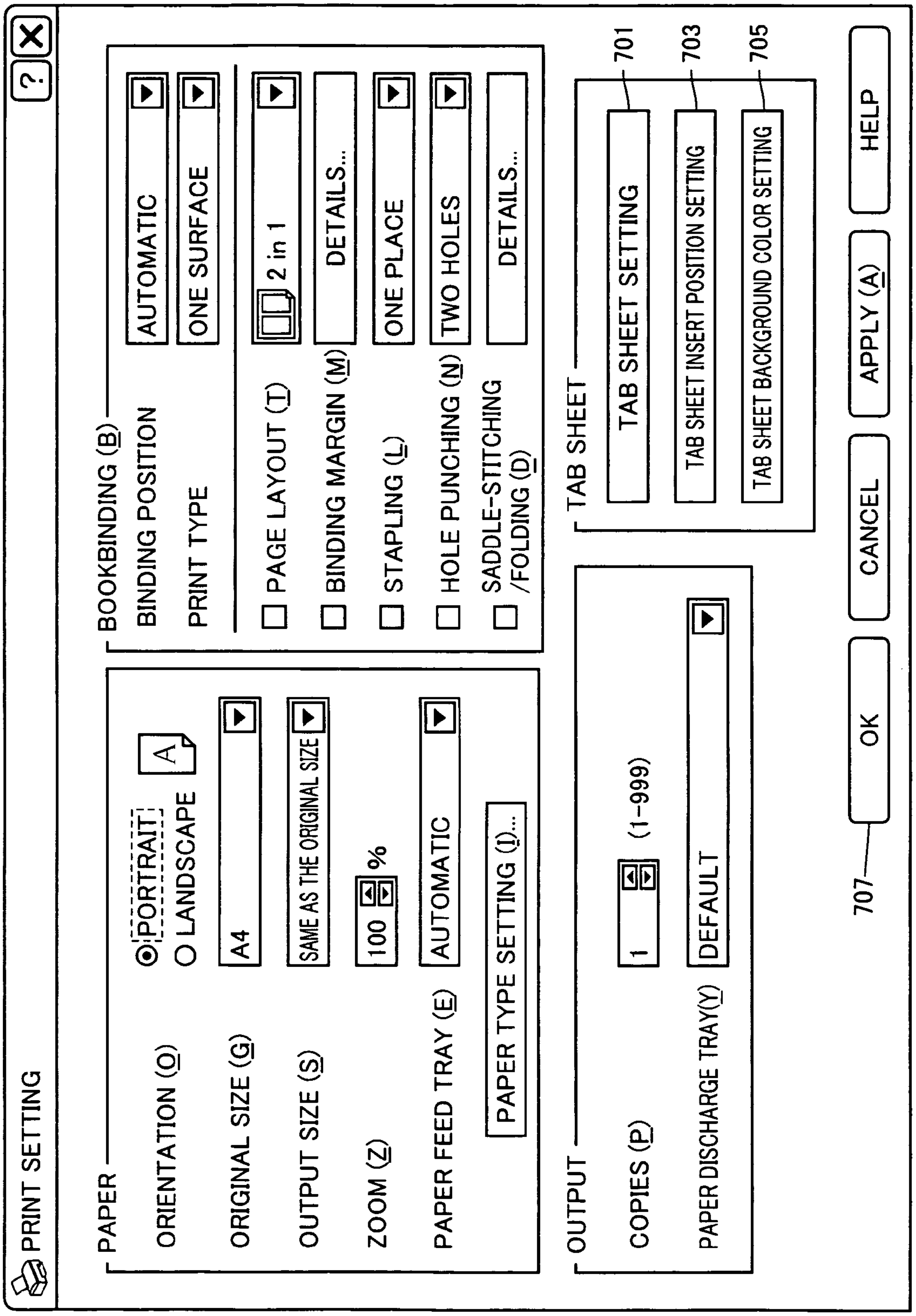
FIG. 8 shows a specific example of a print setting screen.
Figure 9:
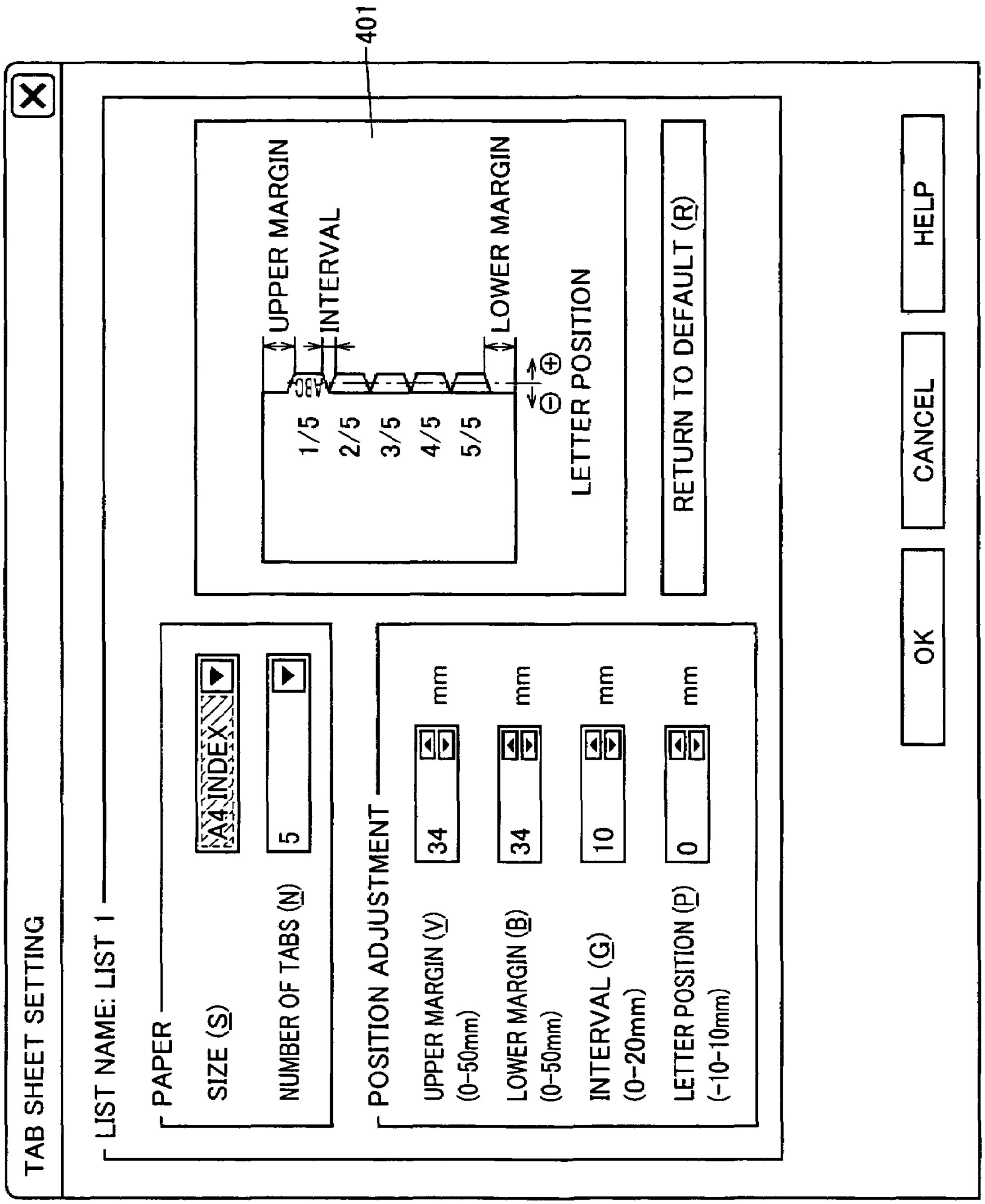
FIG. 9 shows a specific example of a tab sheet setting screen.

FIG. 8 shows a specific example of a print setting screen, displayed when the printer driver is activated, for performing print setting on printing device 1. When a button 701 for tab sheet setting is depressed on the screen shown in FIG. 8, step S101 in the flowchart of FIG. 7 is carried out, with a tab sheet setting screen shown in FIG. 9 being displayed. In step S101, information regarding the shape of the tab sheet (size, number of tabs and the like) as well as setting of the shape of the tab title (upper margin, lower margin, interval, letter position and the like) are received according to the screen shown in FIG. 9. It is preferable that the tab sheet setting screen includes a preview screen 401, as shown in FIG. 9, on which a preview of the tab sheet is displayed in response to input of the above setting to reflect the input.

Figure 10:
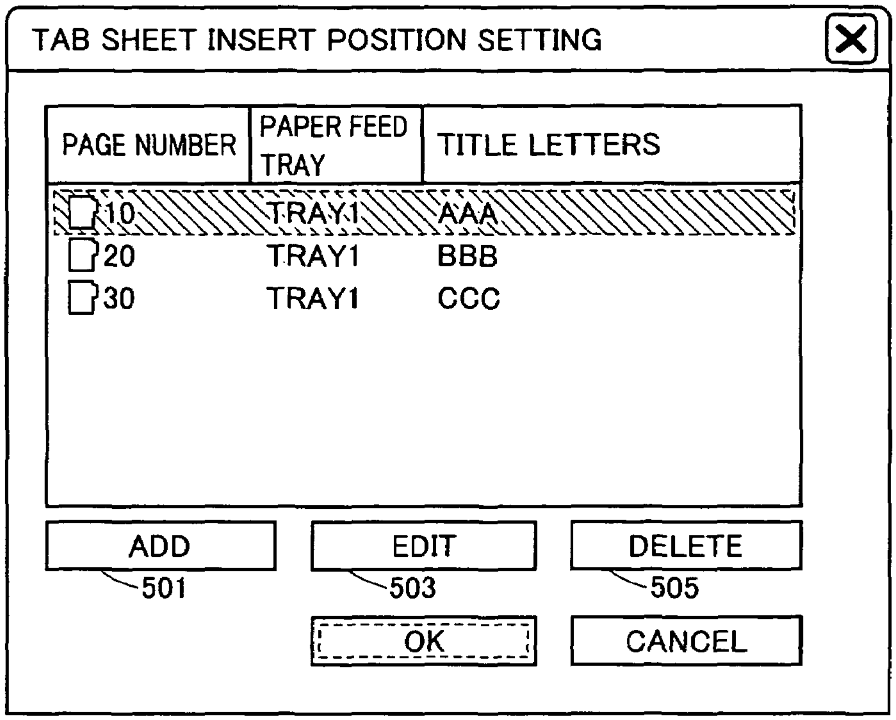
FIG. 10 shows a specific example of a tab sheet insert position setting screen.
Figure 11:
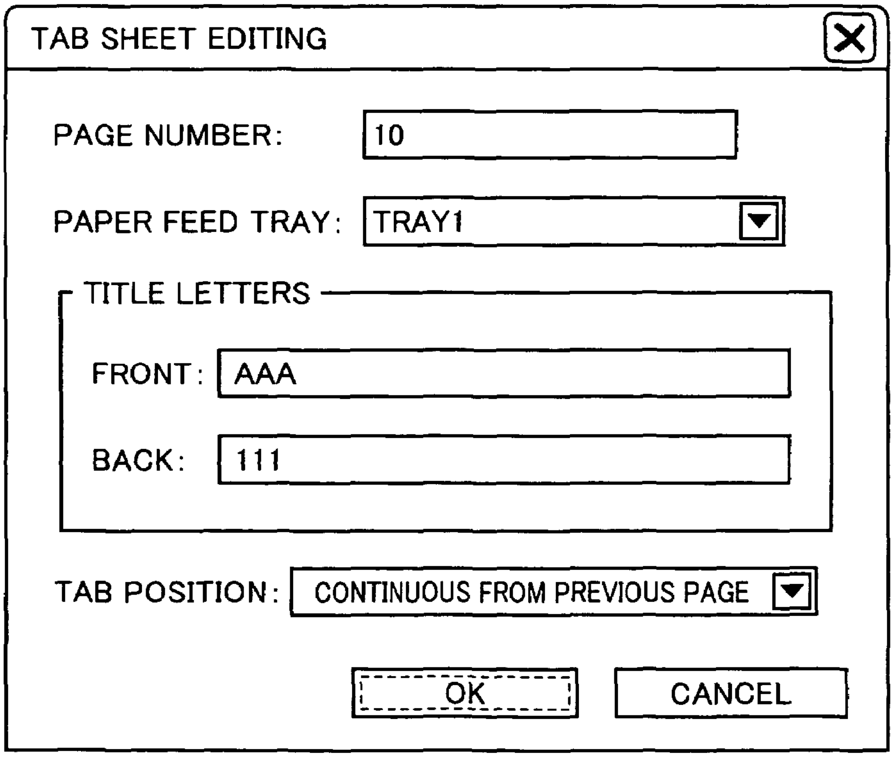
FIG. 11 shows a specific example of a tab sheet editing screen.

Next, when a button 703 for tab sheet insert position setting is depressed on the screen shown in FIG. 8, step S103 in the flowchart of FIG. 7 is carried out, with a tab sheet insert position setting screen shown in FIG. 10 being displayed. In step S103, setting of the position where a tab sheet is to be inserted in the target document information is received for each tab sheet, according to the screen shown in FIG. 10. More specifically, the screen shown in FIG. 10 is provided with a button 501 for adding information for each tab sheet and a button 505 for deleting the information for each tab sheet, and setting of the total number of the tab sheets to be used is received in response to manipulation of these buttons. Further, a button 503 for editing information of each tab sheet is provided, and a tab sheet editing screen shown in FIG. 11 is displayed when button 503 is depressed. For each tab sheet, setting of the insert position in the target document information, designation of the paper feed tray, setting of the letters to be printed on the tab, and setting of the tab position are received according to the screen shown in FIG. 11. For the tab position, preferably, an option for designating the position continuous from the tab position of the immediately preceding tab sheet, and options for designating the positions in accordance with the number of tabs set in step S101 above are displayed, and one of them is selected for setting.

Figure 12:
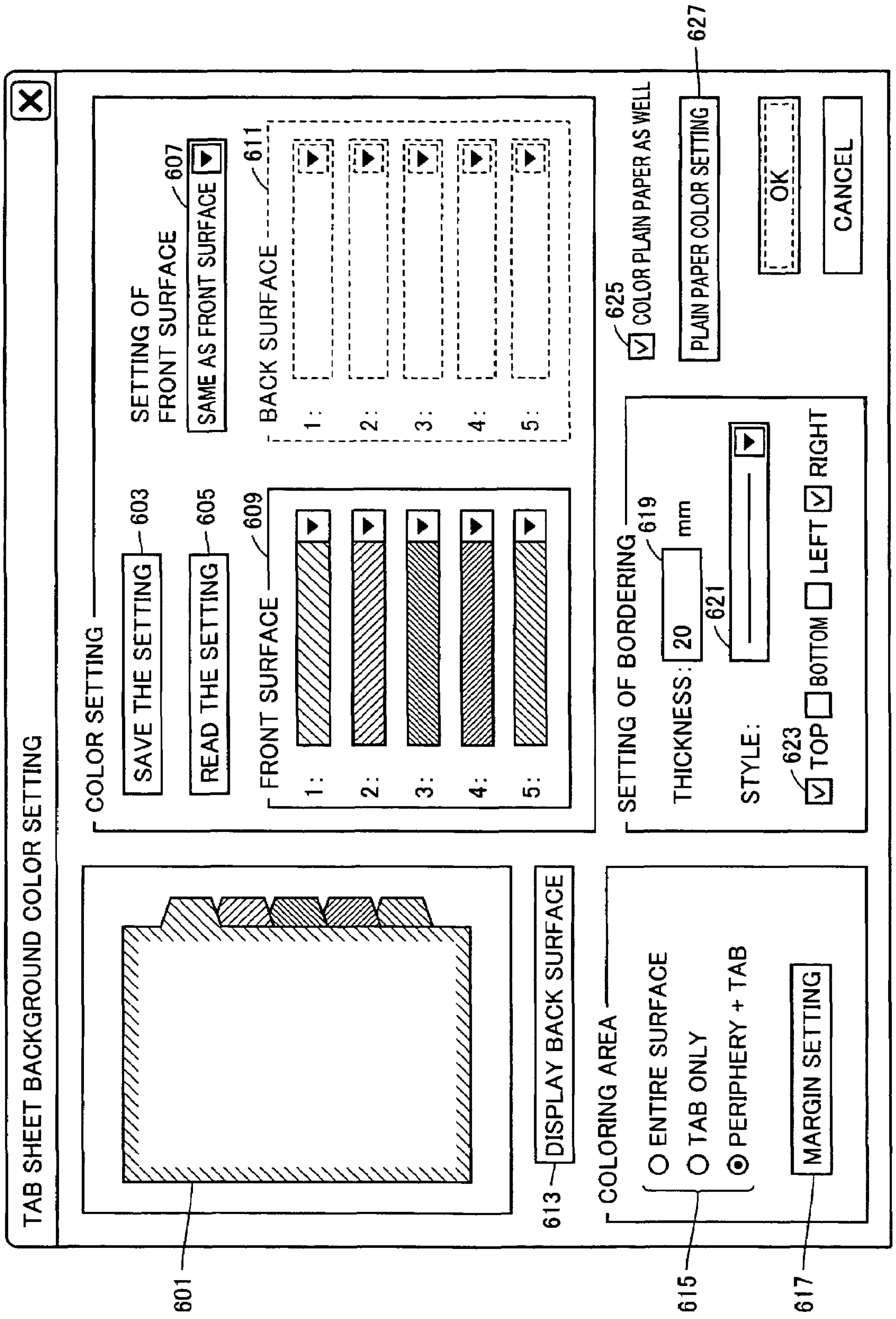
FIG. 12 shows a specific example of a tab sheet background color setting screen.

Next, when a button 705 for tab sheet background color setting is depressed on the print setting screen shown in FIG. 8, step S105 in the flowchart of FIG. 7 is carried out, with a tab sheet background color setting screen shown in FIG. 12 being displayed. In step S105, setting of the background color for each tab sheet is received, according to the screen shown in FIG. 12.

More specifically, the screen shown in FIG. 12 is provided with: a preview screen 601 for displaying a preview of the tab sheet applied with a set background color; a button 603 for storing the setting of the background color of each tab sheet in tab sheet background color storing unit 207; a button 605 for reading the setting of the background color stored in tab sheet background color storing unit 207; a pull-down button group 609 for selecting and setting a desired color for each tab sheet; a pull-down button 607 for selecting whether to set the background color of the back surface of the tab sheet to a color different from or the same as the background color of the front surface; a pull-down button group 611 for selecting and setting a desired color for the back surface of each tab sheet when setting the background color of the back surface to a color different from that of the front surface; a button 613 for displaying a preview of the back surface of the tab sheet on preview screen 601; a button group 615 for selecting a coloring area to be applied with the set background color; a button 617 for setting a margin upon coloring; an input column 619 for setting a line width when coloring (bordering) the periphery of the tab sheet; a pull-down button 621 for selecting and setting a style of the line when coloring (bordering) the periphery of the tab sheet; a check box group 623 for selecting and setting necessity/non-necessity of coloring for each side on the periphery of the tab sheet; a check box 625 for setting whether or not to color the plain paper on which document information is printed; and a button 627 for performing setting about the coloring when the plain paper is to be colored.

In step S105, tab sheet background color setting unit 205 receives setting of the color to be applied as the background color for each tab sheet, in response to manipulation of button group 609. Button group 609 includes five buttons corresponding to the five types of tab sheets in FIG. 12. It is preferable that button group 609 includes buttons of the number corresponding to the number of tabs in the tab sheets being used, which is set previously in step S101. Alternatively, it may include buttons of the number corresponding to the total number of the tab sheets being used, which is set previously in step S103. In the former case, it is possible to set the background colors of the tab sheets for the respective tab positions, and the tab sheets having the same tab position are colored with the same background color. In the latter case, it is possible to set the background color for each tab sheet, and thus, different background colors can be set for the respective tab sheets, or the same background color can be set for the tab sheets designated irrespective of their tab positions.

In step S105, tab sheet background color setting unit 205 may also receive, in response to manipulation of button 607, designation of the background color for the back surface of the tab sheet using button group 611. For the background color of the back surface of the tab sheet, setting of the color different from that of the front surface may be received. Setting of not coloring the back surface may also be received. Setting of not to color the back surface of the tab sheet can restrict the consumed amount of toner, while maintaining the convenience by applying the background color to the tab sheet.

As a configuration example for setting the background colors using button group 609 and button group 611, available colors that are preset for the background colors may be presented in a pull-down manner, and designation of a desired color from among them may be received. As another example, a screen or an input column allowing designation of an arbitrary ratio of three primary colors constituting color may be provided, in which case designation of any color may be received as a desired ratio is designated by using the screen or the input column.

Figure 13:
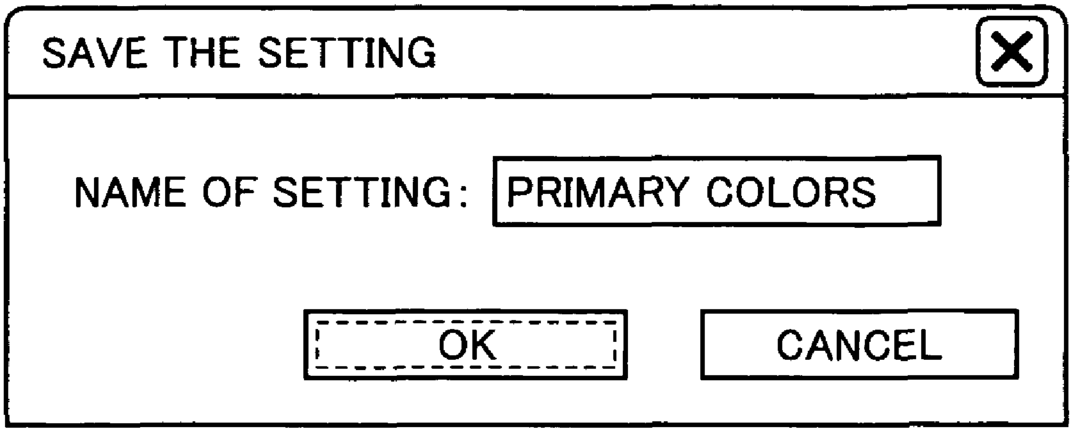
FIG. 13 shows a specific example of a screen for saving setting(s).
Figure 14:
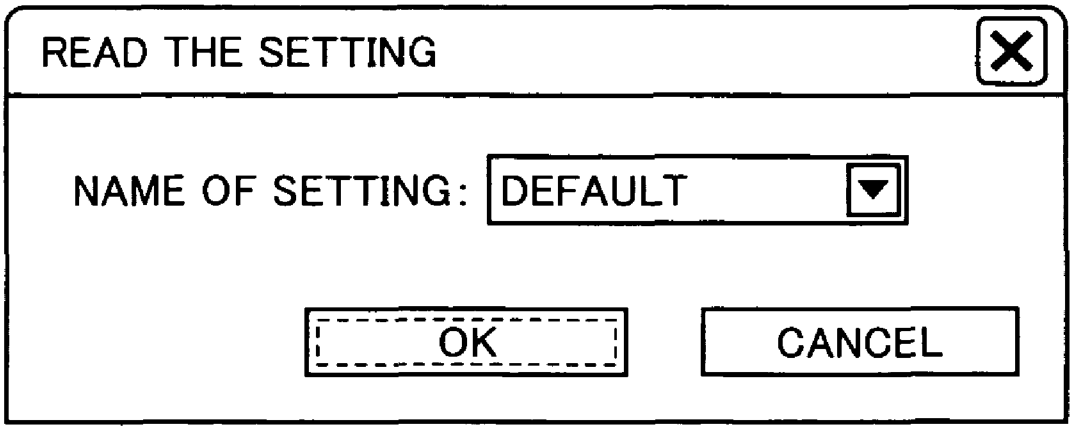
FIG. 14 shows a specific example of a screen for reading setting(s).

Further, if button 603 is depressed here, tab sheet background color setting unit 205 presents a screen for saving setting(s) shown in FIG. 13, receives a name associated with the combination of the background colors of the tab sheets set by button group 609, and stores the current setting of the background colors and the input name in association with each other in tab sheet background color storing unit 207. Tab sheet background color storing unit 207 may also store setting of the background colors in advance. When button 605 is depressed, tab sheet background color setting unit 205 presents a screen for reading setting(s) shown in FIG. 14, receives an input or selection of the name, and reads the setting of the background colors of the tab sheets stored in tab sheet background color storing unit 207 in association with the relevant name. Saving and reading of the setting of the background colors for the back surfaces of the tab sheets are carried out in a similar manner. Needless to say, in the case where there is only one tab sheet, the background color set for the tab sheet is one, in which case setting of one background color as the background color of the tab sheet is stored in association with an input name. Since the setting of the background color(s) can be saved or read in this manner, the user can readily set the background color(s) in accordance with the intended use or preference.

It is preferable that, when the background colors are set using button group 609, or when the combination of the background colors is read from tab sheet background color storing unit 207, tab sheet background color setting unit 205 displays the preview of the tab sheets colored with the background colors on preview screen 601. It is also preferable that, when the combination of the background colors is read from tab sheet background color storing unit 207, the combination of the background colors thus read is displayed on button group 609, and that the relevant combination of the background colors may be changed by manipulation of button group 609.

Figure 15:
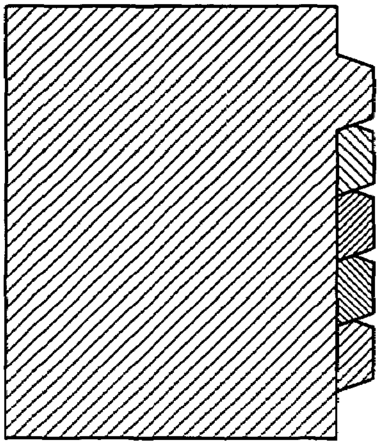
FIGS. 15-17 illustrate coloring areas set for tab sheets.
Figure 16:
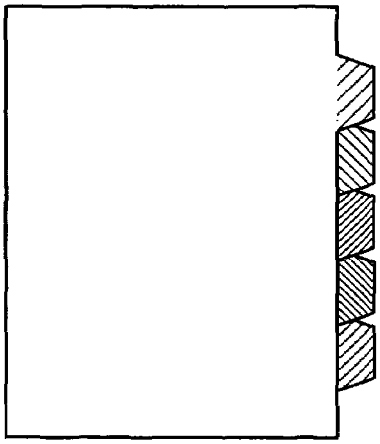
Figure 17:
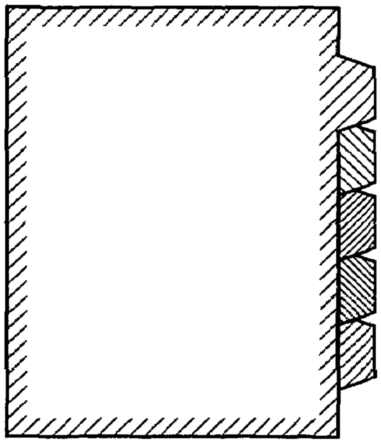

Further, in step S105, tab sheet background color setting unit 205 receives setting of a coloring area, in response to manipulation of button group 615, whether to color the entire tab sheet, or to color only the tab, or to color the periphery and the tab. Herein, to color the entire tab sheet means that the entire surface including the tab portion and the body of the sheet, having the same shape as that of the plain paper, is colored, as shown in FIG. 15. To color only the tab means that the tab portion alone is colored, as shown in FIG. 16, while the body of the sheet is not colored. To color the periphery and the tab means that the entire surface of the tab portion and the periphery of the body of the sheet (the area combining them is hereinafter referred to as the "periphery" of the tab sheet) are colored, as shown in FIG. 17. When the coloring area is set to be only the tab or only the periphery, the consumed amount of the toner may be restricted, while convenience by applying the background color to the tab sheet is ensured.

Figure 18:
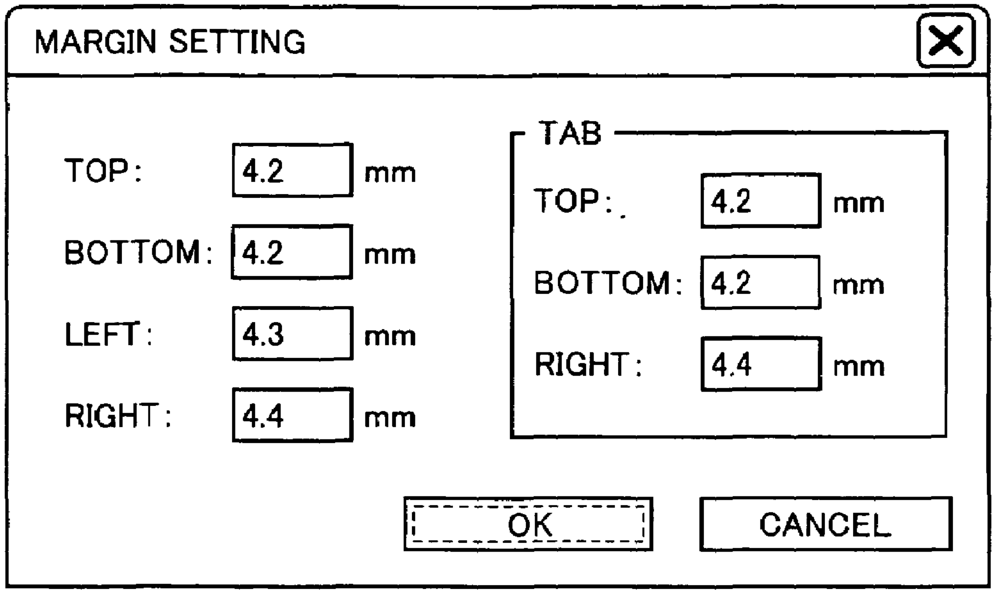
FIG. 18 shows a specific example of a margin setting screen.
Figure 19:
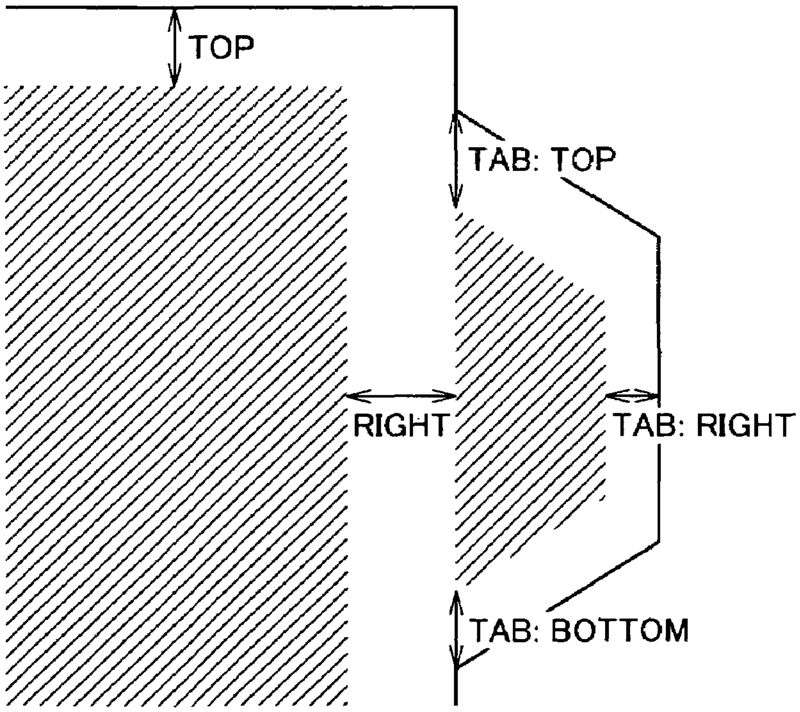
FIG. 19 illustrates setting of the margin.

In the case where the entire surface or the periphery is to be colored, tab sheet background color setting unit 205 presents a margin setting screen shown in FIG. 18, in response to manipulation of button 617, and receives setting of the margin for each side of the body of the sheet, having the same shape as that of the plain paper, as well as for each side of the tab. As a specific way of setting the margin, as shown in FIG. 19, for the body of the sheet, the upper margin may be set as an offset distance from the upper end, and the right margin may be set as an offset distance from the right end in the absence of the tab. For the tab portion, the upper margin may be set as a distance offset in parallel from the upper diagonal side toward the inside of the tab, and the right margin may be set as an offset distance from the right end. Since the margin can be set for each side in this manner, it is possible to color the sheet by avoiding the binding position like punched holes. It is noted that a certain margin will be necessary from the edge of the tab sheet for the functional reason of printing device 1. Therefore, it is more preferable that tab sheet background color setting unit 205 sets the margin necessary for the functional reason of printing device 1 as a lower limit, and that it does not accept the setting of not greater than the lower limit.

Figure 20:
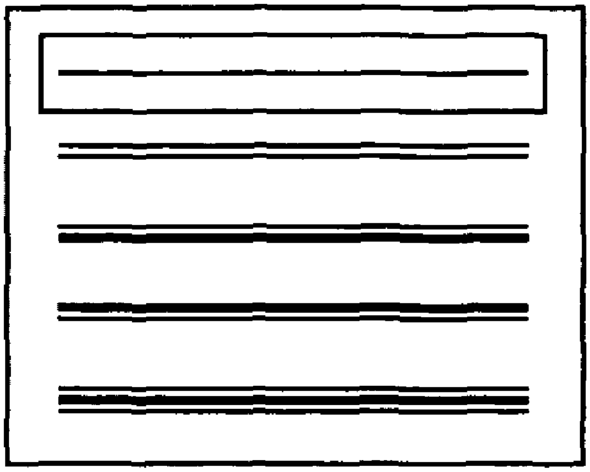
FIG. 20 shows a specific example of line style options.
Figure 21:
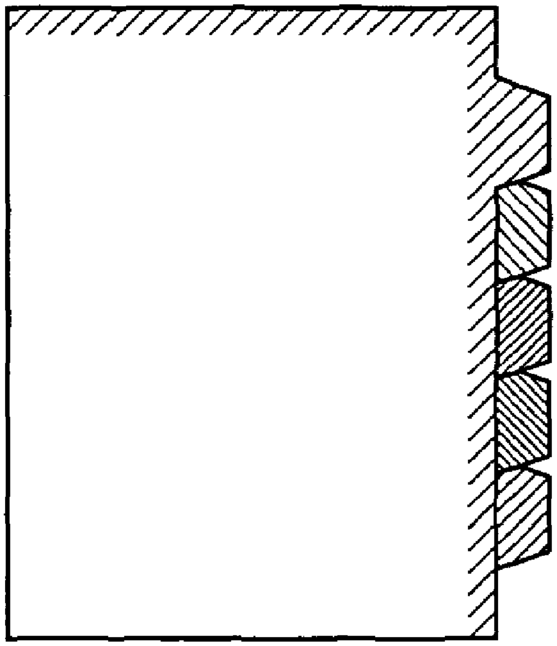
FIG. 21 illustrates coloring areas set for the tab sheets.

Further, in step S105, when the coloring area is set to be the periphery of the tab sheet, tab sheet background color setting unit 205 receives an input of coloring width at input column 619, style of the coloring area corresponding to the coloring width in response to manipulation of button 621, and also receives selection of a side to be colored or a side not to be colored for the body of the sheet at check box group 623. As for the style of the coloring area, it is preferable that options of line styles as shown in FIG. 20 are displayed in response to manipulation of button 621, and that selection of the line style is received in a pull-down manner. When the setting of not to color the bottom and left sides is received at check box group 623, only the selected sides are colored, as shown in FIG. 21. Such setting enables printing of the tab sheets in various styles. Further, since it is possible to set not to color an unnecessary side in the binding direction or the like, the consumed amount of toner can be restricted, while ensuring the convenience by applying the background color to the tab sheet.

When the above-described settings are received in response to manipulation of buttons 615, 617, 621, input column 619, and check box group 623, tab sheet background color setting unit 205 preferably displays a preview of the tab sheet applied with the background color in accordance with the received settings, on preview screen 601.

Further, in step S105, in response to check of check box 625 and manipulation of button 627, tab sheet background color setting unit 205 receives setting of whether or not to color the periphery of the plain paper on which the document information is printed, sandwiched between the neighboring two tab sheets, with the same color as the background color of the tab sheet. It also receives selection of a side to be colored or a side not to be colored for the plain paper, as well as setting of the coloring width and the like. When the periphery of the plain paper on which the document information is printed is colored with the same color as the background color of the tab sheet inserted ahead of the paper, it becomes easy to determine to which section the relevant page belongs.

When the settings in steps S101, S103 and S105 above are finished and an OK button 707 is depressed on the print setting screen shown in FIG. 8 to input completion of settings (YES in step S107), the print control information as shown in FIG. 4 is generated in print control information generating unit 211 based on the settings in steps S101-S105 (step S109), which is then sent to printing device 1 by print control information output unit 217 (step S111).

Figure 22:
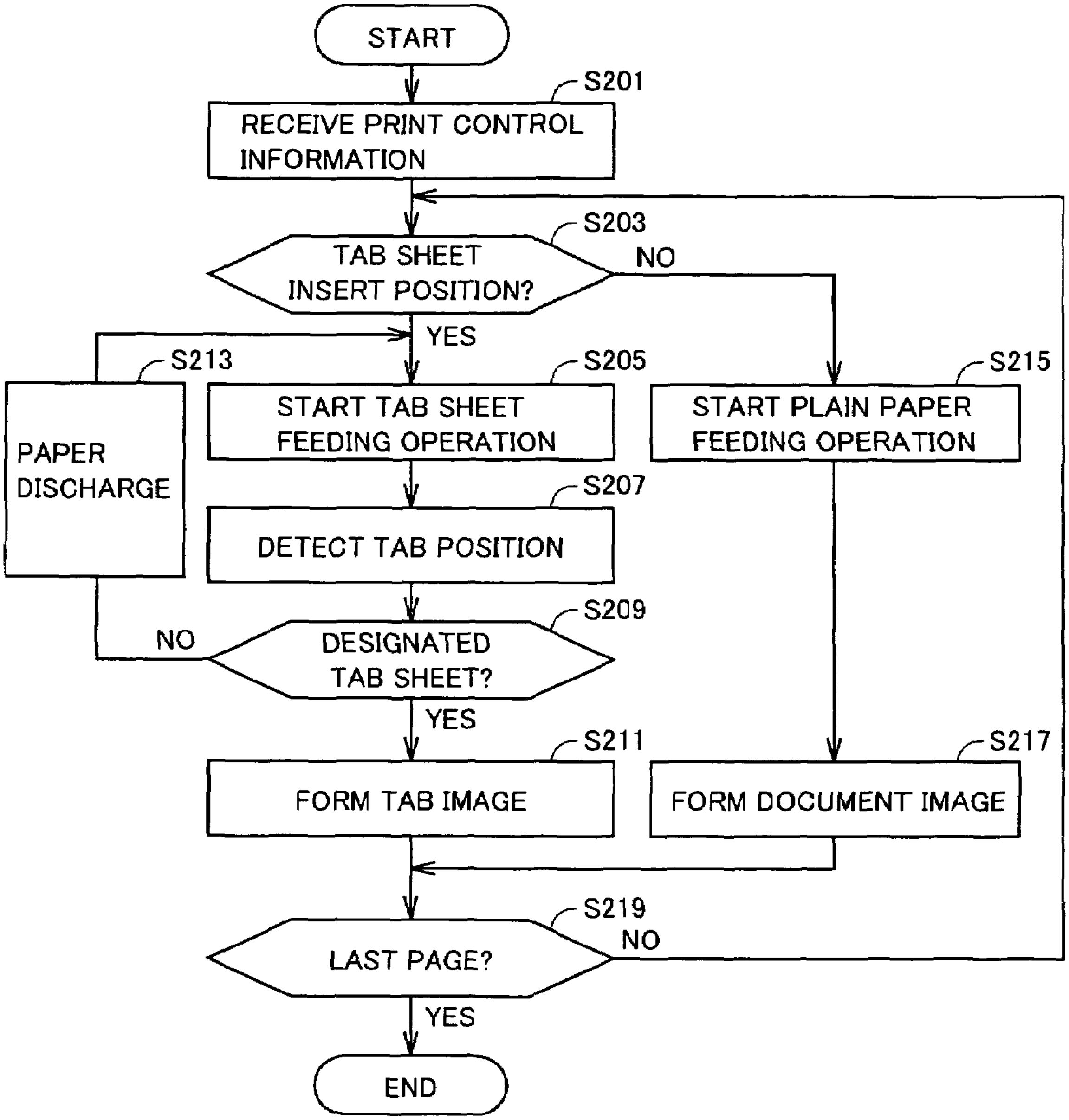
FIG. 22 is a flowchart showing processing executed by printing device 1 for performing printing using a tab sheet.

Processing for performing printing using a tab sheet, shown by a flowchart in FIG. 22, is implemented as CPU 10 of printing device 1 reads and executes a program stored in storage unit 20 or the like, to control the respective units shown in FIG. 1.

Referring to FIG. 22, when the print control information sent from PC 3 via NIC 15 is received (step S201) and input from print control information input unit 301, tab sheet insert position determining unit 307 determines, for each page, whether the page corresponds to the page for inserting a tab sheet or not, based on the tab sheet information included in the print control information (step S203).

If it is determined to be the page for inserting a tab sheet (YES in step S203), a tab sheet feeding operation is started in accordance with an instruction from paper feed instructing unit 309 (step S205). It is then determined by tab sheet shape determining unit 311 whether the fed sheet is the tab sheet of a designated shape (step S207). If it is not the tab sheet of the designated shape, it is discharged to the paper discharge tray for use in discharging an undesignated sheet (NO in step S209, and S213). Steps S205, S207, S209 and S213 are repeated until the tab sheet of the designated shape is fed. When it is determined by tab sheet shape determining unit 311 that a tab sheet of the designated shape has been fed (YES in step S209), a tab sheet image including the background color and the title letters is formed by tab sheet image forming unit 305, based on the tab sheet information, identified as the commands included in the print control information (step S211).

Meanwhile, if it is determined in step S203 that the page does not correspond to the page for inserting a tab sheet, but corresponds to the page for printing document information on plain paper (NO in step S203), a plain paper feeding operation is started in accordance with an instruction from paper feed instructing unit 309 (step S215), and a document image is formed by document image forming unit 303, based on the document information and the information of header and the like included in the print control information (step S217).

If the page for which the image was formed in the above processing is not the last page (NO in step S219), the process returns to step S203, and the above-described processing is repeated until the last page is processed (YES in step S219).

When the above-described processing is carried out in the print system according to the present embodiment, a tab sheet of a desired background color can be generated in printing device 1 by preparing only the tab sheets of a single color (e.g., white). This can restrict the cost compared to the case of preparing tab sheets of different colors for different tab positions. Further, when the coloring area is set in the tab sheet, compared to the case of coloring the entire tab sheet, the amount of toner consumed can be restricted, while ensuring the effect of coloring the tab sheet with the background color.

The present embodiment shows the case where a tab sheet is inserted when document information received via NIC 15 is to be printed by printing device 1 and a background color is set for the tab sheet. Alternatively, the information to be printed may be an image read by image reader unit 30, information stored in storage unit 20, or information input via panel 25.

It is noted that the configurations of printing device 1 and PC 3 shown in FIGS. 3 and 6 and described above correspond to a specific example of configuration of the print system of the present embodiment; the configuration for implementing the present invention is not restricted thereto. Specifically, at least a part of the functional configuration of PC 3 shown in FIG. 3 may be included in printing device 1, or at least a part of the functional configuration of printing device 1 shown in FIG. 6 may be included in the PC 3 side. Further, printing device 1 and PC 3 may be implemented as a single device, and the above-described print control apparatus may be included in the printing device. Still further, the processing illustrated in FIGS. 7 and 22 may be executed by either device. The present invention may include any combination of the functions provided for the devices and any combination of the processing executed by the devices. As a specific example, document image forming unit 303, tab sheet image forming unit 305, tab sheet insert position determining unit 307, and tab sheet shape determining unit 311 may be included in the PC 3 side. At this time, PC 3 may determine whether the shape of the tab sheet is the designated shape based on the sensing signal of sensor 353 of printing device 1, and form a document image or a tab sheet image based on the result, and output the image data to printing device 1 for printing. In this case, of the processing shown in FIG. 22, steps S203, S209, S211 and S217 are executed by PC 3.

Further, it is also possible to provide a program for causing a computer to carry out the above-described processing. Such a program may be recorded on a computer-readable recording medium such as a flexible disk, CD-ROM, ROM, RAM or memory card attached to the computer, and provided as a program product. Alternatively, the program may be provided by recording the same on a recording medium such as a hard disk built in the computer. The program may also be provided by downloading via a network.

The program of the present invention may be one that calls necessary modules at prescribed timings in a prescribed sequence from among the program modules provided as a part of the operation system (OS) of the computer, to cause the processing to be executed. In this case, the modules are not included in the program itself, and the processing is executed in cooperation with the OS. Such a program not containing the modules may be included in the programs of the present invention.

Further, the program of the present invention may be provided in a manner incorporated in a part of another program. In this case as well, modules included in the other program are not included in the program itself, and the processing is executed in cooperation with the other program. Such a program incorporated in another program may also be included in the programs of the present invention.

The program product provided is installed in a program storage unit such as a hard disk for execution. The program product includes the program itself and a recording medium on which the program is recorded.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A print control apparatus controlling a printing device performing printing on a tab sheet inserted between non-tab print sheets of a target document being printed, wherein the tab sheet is identified as a print sheet having a tab, comprising:

a setting unit setting a plurality of tab positions for a plurality of tab sheets, wherein a tab on one tab sheet is set at a position different from a position of a tab on another tab sheet and setting a respective background color for each of said tabs of the plurality of tab sheets at their corresponding tab positions, each of said tabs being provided outside a periphery of the non-tab print sheets;

a generating unit generating control information for causing said printing device to print said respective background colors set by said setting unit on each tab of said plurality of tab sheets and to insert each of said tab sheets in between non-tab sheets of said target document being printed; and a display including a plurality of color menus such that each of the tabs, at their respective set positions, as selected by a user, is provided their own respective color menu.

2. The print control apparatus according to claim 1, further comprising a presenting unit presenting an operation screen to a user, wherein said setting unit presents a setting screen for setting a background color of a tab sheet at said presenting unit, and receives designation of an arbitrary color from said user on said setting screen to set said background color.

3. The print control apparatus according to claim 1, wherein said setting unit sets a first color as a background color of a front surface of said tab sheet, and a second color as a background color of a back surface of said tab sheet.

4. The print control apparatus according to claim 1, wherein said setting unit includes a margin setting unit setting a margin from each side of said tab sheet from for applying said background color to said tab sheet.

5. The print control apparatus according to claim 1, wherein said setting unit includes an area designating unit designating an area of said tab sheet to be applied with said background color.

6. The print control apparatus according to claim 5, wherein said area designating unit designates a periphery of said tab sheet as said area.

7. The print control apparatus according to claim 6, wherein said area designating unit designates, as said area, presence/absence of coloring of said background color for each side of said periphery.

8. The print control apparatus according to claim 6, wherein said area designating unit designates a coloring width on said periphery.

9. The print control apparatus according to claim 6, wherein said area designating unit designates a style of a coloring area on said periphery.

10. The print control apparatus according to claim 1, wherein said setting unit includes a first designating unit that designates such that a periphery of a print sheet for printing document information thereon, sandwiched between continuous first and second tab sheets, is colored with the same color as the background color set for said tab sheet located in front of said print sheet.

11. The print control apparatus according to claim 10, further comprising a second designating unit that designates, for the periphery of said print sheet for printing said document information thereon, at least one of presence/absence of coloring for each side, a coloring width on said periphery, and a style of a coloring area on said periphery.

12. The print control apparatus according to claim 1, further comprising a storing unit storing said background color set by said setting unit, wherein said setting unit reads said background color stored in said storing unit and sets the color as the background color of said tab sheet.

13. The print control apparatus according to claim 1, further comprising a storing unit storing a background color in advance, wherein said setting unit reads said background color stored in said storing unit and sets the color as the background color of said tab sheet.

14. The print control apparatus according to claim 1, wherein said control information includes a command for forming an image to be printed on a tab sheet and document information as a target of printing, said print control apparatus further comprising:

a tab sheet insert position determining unit determining whether a page to be processed corresponds to a page for performing printing on a tab sheet or not, based on said control information;

a paper feed unit instructing said printing device to feed a tab sheet when it is determined in said tab sheet insert position determining unit that said page to be processed corresponds to the page for performing printing on a tab sheet;

a tab sheet shape determining unit determining if the fed sheet corresponds to a designated tab sheet; and an image forming unit forming an image to be printed on said tab sheet in accordance with said command included in said control information when it is determined in said sheet shape determining unit that said fed sheet corresponds to the designated tab sheet.

15. The print control apparatus according to claim 1, wherein said setting unit sets a first color as a background color of a tab sheet having a tab in a first tab position, and a second color as a background color of a tab sheet having a tab in a second tab position.

16. The print control apparatus according to claim 1, wherein said setting unit sets a first color as a background color of a first tab sheet, and a second color as a background color of a second tab sheet.

17. The print control apparatus according to claim 1, wherein each of the color menus from said plurality of color menus is a pull-down menu.

18. A print control program product embodied in a non-transitory computer readable medium causing a computer to execute control of a printing device performing printing on a tab sheet inserted between non-tab print sheets of a target document being printed, wherein the tab sheet is identified as a print sheet having a tab, said control comprising the steps of:

presenting an operation screen to a user;

receiving designation, from the user, of a plurality of different tab positions for a plurality of tab sheets;

presenting, on said operation screen, a plurality of color menus such that each tab, at its designated position, is provided its own respective color menu;

receiving designation, from the user, of respective background colors for each of said tabs of the plurality of tab sheets at their corresponding designated tab positions, each of said tabs being provided outside a periphery of the non-tab print sheets according to said operation screen;

generating control information for causing said printing device to print said respective background color set on each tab of said plurality of tab sheets and to insert each of said tab sheets in between non-tab sheets of said target document being printed; and transmitting said control information to said printing device.

19. A print control method for controlling a printing device performing printing on a tab sheet inserted between non-tab print sheets of a target document being printed, wherein the tab sheet is identified as a print sheet having a tab, using a print control apparatus, comprising the steps of:

presenting an operation screen to a user;

designating and displaying a plurality of different tab positions for a plurality of tab sheets, as selected by the user;

presenting, on said operation screen, a plurality of color menus such that each tab, at its designated position, is provided its own respective color menu;

designating respective background colors, as selected from said respective color menus by the user, for each of said tabs of said plurality of tab sheets at their corresponding tab positions, each of said tabs being provided outside a periphery of the non-tab print sheets according to said operation screen;

generating control information for causing said printing device to print said respective background colors set on each tab of said plurality of tab sheets and to insert each of said tab sheets in between non-tab sheets of the target document being printed; and providing said control information to said printing device.

20. The print control method according to claim 19, wherein the method further includes designating a background color by designating a periphery of said tab sheet as an area of said tab sheet to be applied with said background color.

21. The print control apparatus according to claim 1, wherein said display includes a first area and a second area, said first area displaying the tabs, at their respective set positions, for the plurality of tab sheets, and said second area displaying said color menus for each of the tabs.

22. The print control method according to claim 19, further presenting, on said operation screen, a first area and a second area, said first area displaying the tabs, at their respective designated positions, for the plurality of tab sheets, and said second area displaying, the color menus for each of the tabs.

23. The print control method according to claim 19, wherein each of the color menus from said plurality of color menus is a pull-down menu.

* * * * *